(12) United States Patent
Cho

(10) Patent No.: US 6,406,119 B1
(45) Date of Patent: Jun. 18, 2002

(54) INK SMEARING PREVENTING METHOD OF TERMINAL EQUIPMENT OF INKJET OUTPUT DEVICE

(75) Inventor: Kyu-O Cho, Suwon (KR)

(73) Assignee: Samsung Electronics Co., Ltd., Suwon (KR)

( * ) Notice: Subject to any disclaimer, the term of this patent is extended or adjusted under 35 U.S.C. 154(b) by 0 days.

(21) Appl. No.: 09/572,376

(22) Filed: May 18, 2000

(51) Int. Cl.[7] .................................................. B41J 2/01

(52) U.S. Cl. ......................................................... 347/16

(58) Field of Search ............................. 347/14, 16, 104

(56) References Cited

U.S. PATENT DOCUMENTS

| | | | | |
|---|---|---|---|---|
| 5,489,926 A | * | 2/1996 | Arbeiter | 347/16 |
| 5,714,990 A | * | 2/1998 | Courtney | 347/14 |
| 6,015,201 A | * | 1/2000 | Asakura | 347/19 |

* cited by examiner

Primary Examiner—John Barlow
Assistant Examiner—Craig A. Hallacher
(74) Attorney, Agent, or Firm—Robert E. Bushnell, Esq.

(57) ABSTRACT

An ink smearing preventing method of terminal equipment of inkjet output device resolves the drawback of the ink smearing which is caused due to ejection prior to ink drying during data printing onto paper, for which the ink smearing preventing method is provided to a printing manner where the next line is systematically printed regardless of the amount of ink sprayed, to adjust the printing speed such that the paper is ejected after the sprayed ink dries, by regulating the printing time of the next line according to the amount of ink, after determining the amount of ink sprayed. Meanwhile, the ink smearing preventing method includes the steps of determining whether there is data to be printed in the terminal equipment; calculating the dot number of the ink required for printing the data in a predetermined unit if there is data to be printed; printing the data in the predetermined unit on paper by initiating actuation of a timer corresponding to the calculated dot number; determining, after printing, whether the actuation of the timer is completed, and moving the paper as much as the predetermined unit if actuation of the timer is completed. Here, the timer corresponding to the calculated dot number is data-based and preset in the memory of the terminal equipment, to a numerical value that is proportional to the data dot number for printing black ink. Accordingly, by determining the amount of ink used, when printing data in an inkjet type terminal equipment, and by adjusting the print time of the next line according to the determined amount, it is possible to regulate the printing speed such that the paper is ejected after the sprayed ink has dried. Therefore, there is the advantage of preventing data loss that may occur from the user's carelessness.

17 Claims, 3 Drawing Sheets

INK SMEARING PREVENTING METHOD OF TERMINAL EQUIPMENT OF INKJET OUTPUT DEVICE

BACKGROUND OF THE INVENTION

1. Field of the Invention

This invention relates to data printing in an inkjet type terminal equipment and more particularly, to a method that allows speed reduction of printing and ejecting of paper after the ink dries to prevent ink smearing in cases where more than the usual amount of ink is sprayed when there is a large amount of data to be printed during data printing in the terminal equipment of an inkjet output device.

2. Prior Art

The present specification describes this invention with a facsimile among the inkjet type terminal equipments as an illustrative example.

A facsimile is a device that enables exchange of documents through the provision of a scanner that is able to read internal documents, a printer that is able to print out data in the form of characters, and a communication section such as a telephone line that enables transmission and reception of data with a long distance counterpart.

Conventionally, among facsimiles, while the printing method of normal paper facsimiles using toners or a thermal detection section is a horizontal line unit based, a facsimile which employs the inkjet method simultaneously prints vertical direction data in the amount corresponding to the number of nozzles in the cartridge.

Namely, the facsimile prints a certain amount of data in one operation and then changes the position of the paper according to a predetermined time to the next position and prints the next line.

This prior art prints one line and then ejects the paper at a certain speed and then directly prints the next line. However, in some cases when there is a large amount of data, because the paper is ejected before the ink dries, there is a drawback of the data being lost due to the ink smearing by the contact of the paper with the user's hands or other objects.

SUMMARY OF THE INVENTION

Therefore, this invention is disclosed to resolve the problems set forth above, and the object thereof is to resolve the drawback of the ink smearing caused due to paper ejection prior to ink drying during a data printing operation, accordingly, in a printing manner where the next line is systematically printed regardless of the amount of ink sprayed, this invention provides a method of adjusting the printing speed such that the paper is ejected after the sprayed ink dries by regulating the printing time of the next line according to the amount of ink, after determining the amount of ink sprayed.

To achieve the above objects in printing data in an inkjet type terminal equipment, a method of preventing ink smearing in an inkjet type terminal equipment according to the present invention includes the steps of determining whether there is data to be printed in the terminal equipment; calculating the dot number of the ink required for printing the data in a predetermined unit if there is data to be printed; printing the data in the predetermined unit on paper by initiating actuation of a timer corresponding to the calculated dot number; determining, after printing, whether the actuation of the timer is completed; and moving the paper as much as the predetermined unit if actuation of the timer is completed.

Preferably, the predetermined unit is a one band unit in which the printer of the terminal equipment prints the data.

Preferably, the actuation of the timer corresponding to the calculated dot number is actuated according to a value that is databased such that it corresponds to the calculated dot number on a one to one ratio.

BRIEF DESCRIPTION OF THE DRAWINGS

The above objects and features of this invention will become more apparent through detailed descriptions of the preferred embodiments and with reference to the drawings annexed hereto.

DESCRIPTION OF THE PREFERRED EMBODIMENTS

The above mentioned objects, features and advantages of this invention are described in greater detail hereinafter through the preferred embodiments depicted in the annexed drawings.

Figure 1:
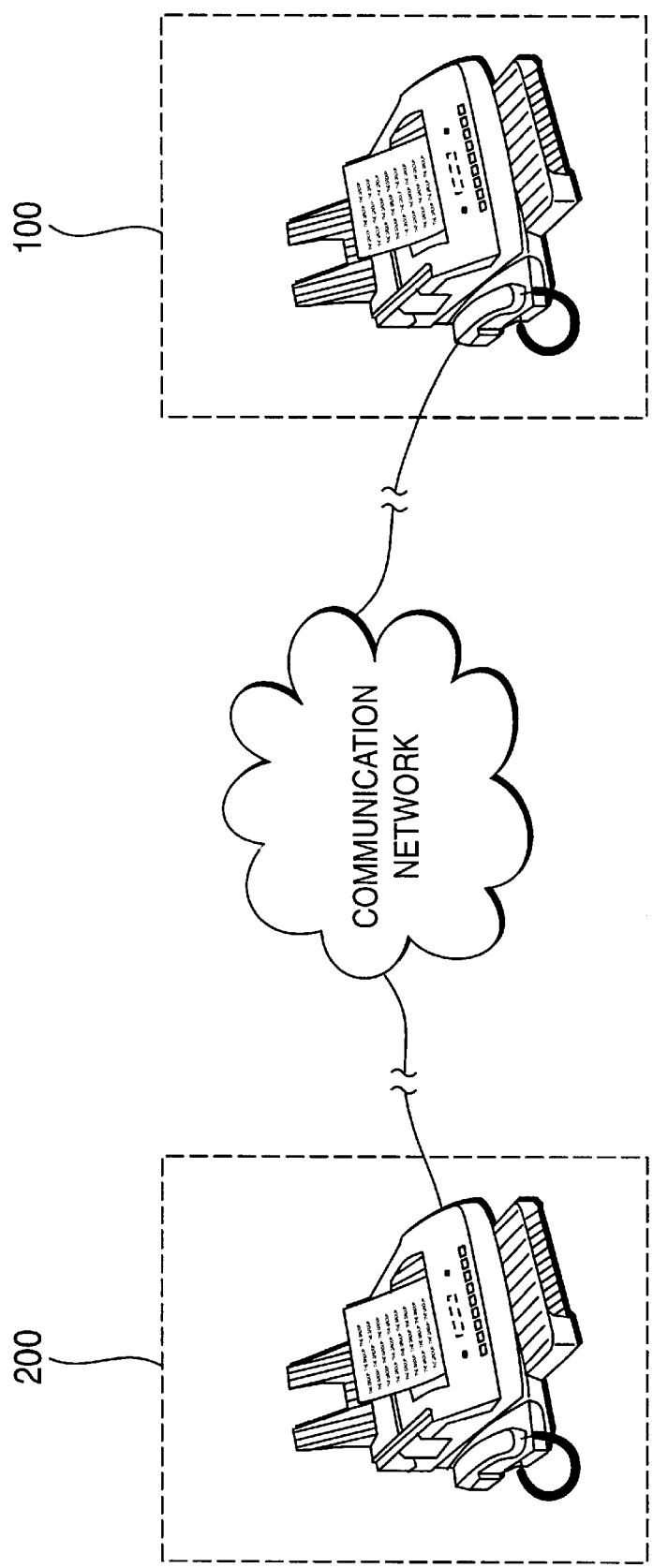
FIG. 1 shows the connection of facsimiles according to the present invention.

FIG. 1 is a perspective diagram showing the connection structure of facsimiles for performing this invention.

As shown, the transmitting facsimile 200 and the receiving facsimile 100 are connected such that they are able to transmit and receive data respectively through a communication network.

Here, the data of the receiving facsimile is printed through the use of paper loaded on a paper loading tray (not shown).

Figure 2:
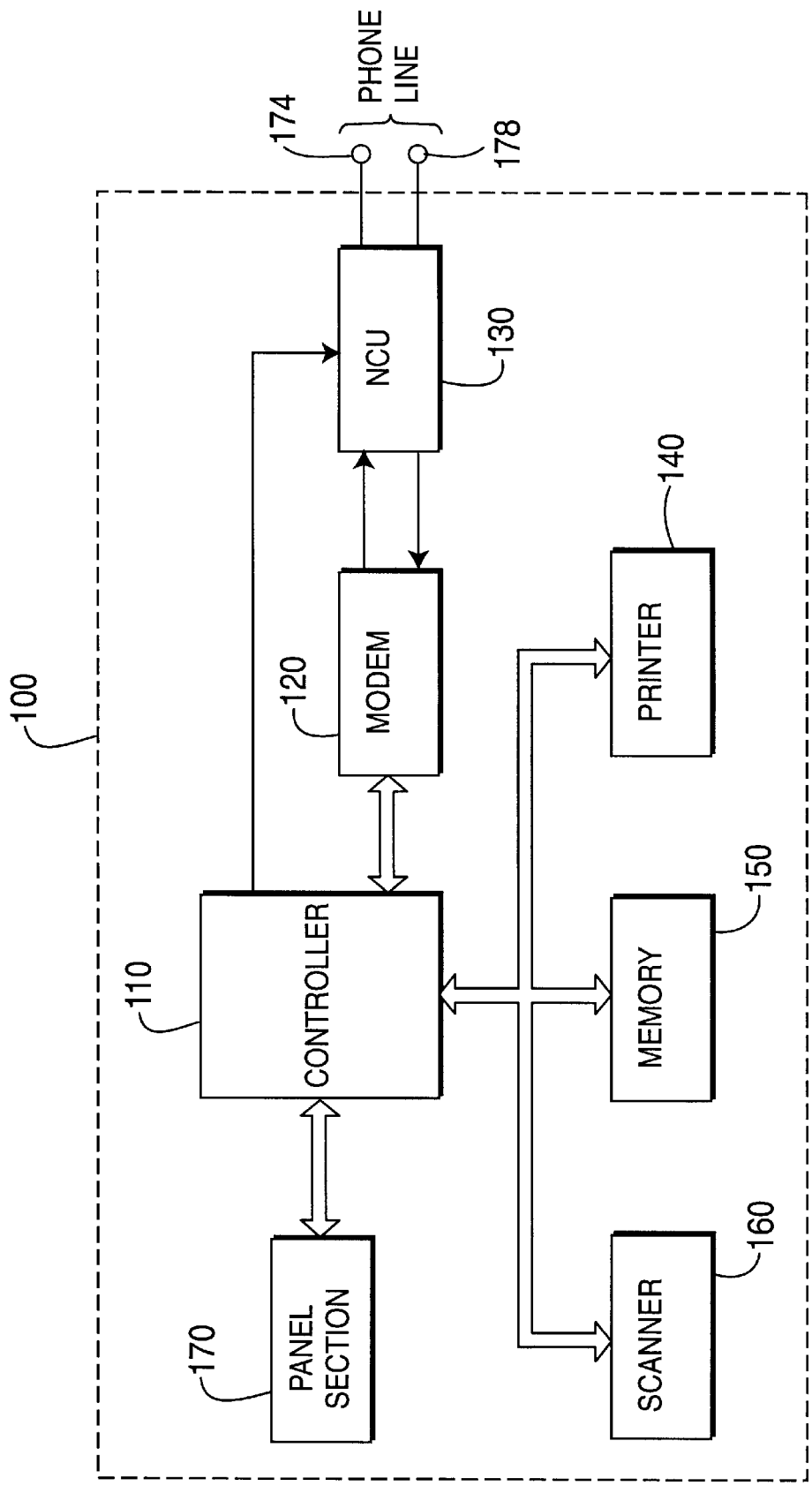
FIG. 2 is a block diagram showing the composition of a facsimile according to the present invention.

FIG. 2 is a block diagram showing the composition of the facsimile according to this invention.

Firstly, the controller 110 generally controls the facsimile 100 according to the system program that is stored in the memory 150 for actuating the facsimile 100.

In particular, according to this invention, in the memory 150 in which time for preventing ink smearing is preset and stored, the applicable time is checked, and the functions of the facsimile 100 printer are used to control the printing speed of printed documents.

In the memory 150 there are stored the system program for the facsimile actuation, protocol data and contents regarding character data transmission and reception, and according to this invention, the time for preventing ink smearing is preset and stored according the ink dot number.

In addition, according to this invention, it includes a buffer that stores one band data for printing through the printer 140 of the facsimile 100.

The panel section (OPE: Operating Panel) 170 includes a plurality of keys to enable generation of key data that is inputted to the controller 110 when generated, and a displaying unit for showing indication data such as the progress status of various operations of the controller 110 or system information.

The scanner 160 scans the paper data in the amount of the size of the set paper according to this invention, and converts the scanned data into digital image data and provides digitalized data to the controller 110.

The modem 120 modulates the output data of the controller 110 into analog form and demodulates and outputs the analog input signal under the control of the controller 110.

The network control unit (NCU) 130 is actuated according to the controls of the controller 110 and forms a public switching telephone network (PSTN) having a Ring 174 and Tip 178 communication loop, and interfaces the signals of the PSTN with the modem.

The printer 140 prints the print data stored in the memory 150 according to print signals from the controller 110.

Figure 3:
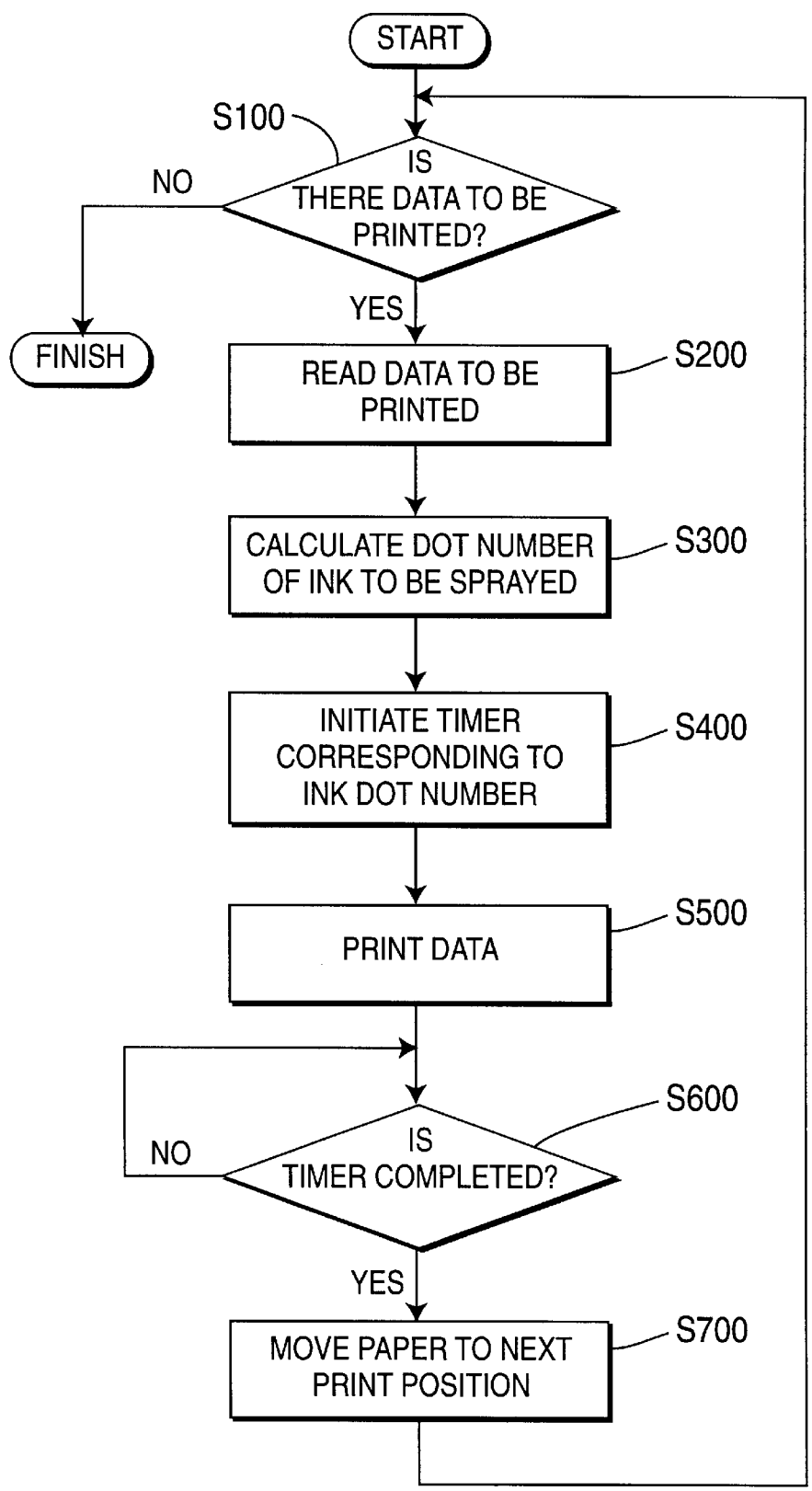
FIG. 3 is a flow chart showing the method of preventing ink smudge in an inkjet type of terminal equipment.

The method of preventing ink smudge in an inkjet type terminal equipment according to this invention is described hereinafter with reference to FIGS. 1, 2 and 3.

Firstly, whether there is data to be printed through the use of the facsimile 100 printer 140 is determined (Step S100).

Here, the determination of the existence of the data to be printed is possible by the controller 110 checking whether there is data to be printed in the memory 150.

In addition, the data to be printed includes facsimile data received from the transmitting facsimile 200 through the communication network, and reading data generated through the use of the functions of the scanner 160 of the receiving facsimile 100.

If there is the data to be printed, the data is read at the memory 150 in a predetermined unit (Step S200).

Here, the predetermined unit refers to a one band unit. The data to be printed is able to be printed in the printer 140 of the facsimile 100, and a buffer (not shown), which stores the one band data, is a component of the memory 150.

Next, the ink dot number required to print the data to be printed that is read-in at the memory 150 in the predetermined unit is calculated (Step S300).

Here, the ink dot number is a data dot number within the one band unit in the buffer, and the dot number is calculated by the controller 110 of the facsimile 100 calculating the dot number of data for printing which is stored within the one band unit.

The timer is actuated corresponding to the calculated dot number (Step S400), and the data to be printed is printed on paper in the predetermined unit (Step S500).

Here, the timer is actuated corresponding to the calculated dot number, according to values which are databased in the memory 150 of the facsimile 100 as a numerical value that is proportional to the data dot number and set at a one to one ratio.

More specifically, if one hundred dots are set for printing in black color with one half of a second (0.5 sec) set as the dot drying time, this means that when the dot number is 200 the dot drying time is set at one second (1.0 sec).

After the data is printed in the predetermined unit, whether the actuation of the timer is completed is determined (Step S600).

If the actuation of the timer is determined to be completed as a result of the determining step, the paper is moved as much as the predetermined unit (Step S700).

That is to say, if one hundred dots are used for printing, it takes 0.5 sec to move the paper, which is loaded on the paper loading tray of the facsimile 100 to print data, to the next printing position, while if two hundred dots are used for printing, it takes 1.0 sec to move the paper as much as one band unit.

After moving the paper as much as one band unit, if it is determined that there is no more data to be printed in the memory 140 as a result determining the existence of data to be printed (Step S100), the printing is stopped and the operation is concluded.

As discussed above, according to this invention, the amount of ink used when printing data in an inkjet type terminal equipment is determined, and by adjusting the print time of the next line according to the amount of ink, it is possible to regulate the printing speed such that the paper is ejected after the sprayed ink has dried.

Therefore, there is the advantage of preventing data loss that may occur from the user's carelessness.

It is to be understood, however, that even though the present invention has been described with reference to the annexed drawings which depict the preferred embodiments thereof, the present invention is not limited to the embodiments, and may apparently be modified in many ways by those ordinarily skilled in the art without departing from the general principle and scope of the invention expressed in the appended claims.

What is claimed is:

1. An ink smearing preventing method of a terminal equipment of an inkjet output device, comprising the steps of:
   determining whether there is data to be printed in said terminal equipment;
   calculating a dot number of the ink required in printing the data in a predetermined unit if there is data to be printed;
   printing the data in the predetermined unit on a printable medium by initiating actuation of a timer corresponding to the calculated dot number;
   determining, after printing, whether the actuation of said timer is completed; and
   moving said printable medium as much as said predetermined unit if actuation of said timer is determined to be completed as a result of the determining whether the actuation of said timer is completed step.

2. The method as claimed in claim 1, with said predetermined unit being a one band unit in which the printer of said terminal equipment prints the data.

3. The method as claimed in claim 1, with the actuation of said timer corresponding to said calculated dot number is actuated according to a value that is databased such that it corresponds to the calculated dot number on a one to one ratio.

4. The method of claim 3, with said step of determining whether there is data to be printed being managed by a controller checking a memory whether there is data to be printed.

5. The method of claim 4, with the data to be printed including facsimile data received by said terminal equipment through a communication network, and reading data generated through a use of functions of a scanner portion of said terminal equipment.

6. The method of claim 4, further comprising the step of reading said memory according to said predetermined unit when there is data to be printed, said predetermined unit being a band unit stored in a buffer memory portion of said memory.

7. The method of claim 2, with said actuation of said timer corresponding to said calculated dot number, said timer being actuated according to a value, said value being databased to correspond to said calculated dot number on a one to one ratio.

8. A method, comprising the steps of:
   determining whether there is data to be printed in an apparatus, said apparatus printing by jetting ink on a printable medium, the data transmitted through a network to said apparatus;
   determining a dot number of the ink required in printing the data having a size of a predetermined unit when there is data to be printed;
   actuating a timer according to said determined dot number;
   printing the data of said predetermined unit on a printable medium by initiating actuation of said timer;

determining whether the actuation of said timer is completed; and moving said printable medium a distance corresponding to said predetermined unit when actuation of said timer is determined to be completed.

9. The method as claimed in claim 8, with said predetermined unit being a one band unit, said apparatus printing the data according to said one band unit.

10. The method as claimed in claim 8, with said actuation of said timer corresponding to said determined dot number, said timer being actuated according to a value, said value directly proportional to said determined dot number and being databased in said apparatus.

11. The method of claim 8, with said step of determining whether there is data to be printed being managed by a controller checking a memory whether there is data to be printed.

12. The method of claim 11, with the data to be printed including facsimile data received by said apparatus through said network, and reading data generated through a use of functions of a scanner portion of said apparatus.

13. The method of claim 12, with said actuation of said timer corresponding to said calculated dot number, said timer being actuated according to a value, said value being databased to correspond to said calculated dot number on a one to one ratio.

14. An apparatus, comprising:

a printing unit outputting an image on a printable medium with ink;

a memory storing data to be outputted on said printing unit;

a controller determining whether there is data in said memory to be printed on said printing unit, said controller calculating a dot number of the ink required in printing the data having a size of a predetermined unit when there is data to be printed, said controller actuating a timer according to said calculated dot number, said controller actuating a printing of the data of said predetermined unit on a printable medium by initiating actuation of said timer, said controller determining after printing whether the actuation of said timer is completed, said controller setting said printing unit to move said printable medium a distance corresponding to said predetermined unit if actuation of said timer is determined to be completed.

15. The apparatus of claim 14, with said predetermined unit being a one band unit, said printing unit printing the data according to said one band unit.

16. The apparatus of claim 15, with said actuation of said timer corresponding to said calculated dot number and being actuated according to a value, said value directly related to said determined dot number and being databased in said apparatus.

17. The apparatus of claim 16, with said printing unit being an inkjet output device, and said data being received through a public switching telephone network

* * * * *